(12) United States Patent
Garrison et al.

(10) Patent No.: US 8,074,997 B2
(45) Date of Patent: Dec. 13, 2011

(54) AIR RIDING SEAL

(75) Inventors: Glenn M. Garrison, Perkiomenville, PA (US); Alan D. McNickle, Telford, PA (US); Diane McNickle, legal representative, Telford, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

(21) Appl. No.: 12/944,973

(22) Filed: Nov. 12, 2010

(65) Prior Publication Data

US 2011/0057396 A1    Mar. 10, 2011

Related U.S. Application Data (63) Continuation of application No. 12/394,283, filed on Feb. 27, 2009, now Pat. No. 7,938,402, which is a continuation-in-part of application No. 11/134,249, filed on May 20, 2005, now abandoned.

(60) Provisional application No. 60/575,351, filed on May 28, 2004.

(51) Int. Cl.
*F16J 15/00* (2006.01)
*F16J 15/447* (2006.01)

(52) U.S. Cl. ........................................ 277/348; 277/421

(58) Field of Classification Search .................. 277/348, 277/352, 412, 421
See application file for complete search history.

(56) References Cited

U.S. PATENT DOCUMENTS

| | | | | |
|---|---|---|---|---|
| 5,174,584 A * | 12/1992 | Lahrman | ........................ | 277/400 |
| 5,284,347 A * | 2/1994 | Pope | .............................. | 277/305 |
| 5,301,957 A * | 4/1994 | Hwang et al. | ................. | 277/350 |
| 5,593,165 A * | 1/1997 | Murray et al. | ................. | 277/543 |
| 5,769,604 A * | 6/1998 | Gardner et al. | ............ | 415/170.1 |
| 5,954,477 A * | 9/1999 | Balsdon | ........................... | 416/95 |
| 6,145,840 A * | 11/2000 | Pope | .............................. | 277/348 |

FOREIGN PATENT DOCUMENTS

| | | |
|---|---|---|
| EP | 833039 A1 * | 4/1998 |
| EP | 1209389 A2 * | 5/2002 |
| JP | 2006342797 A * | 12/2006 |

* cited by examiner

*Primary Examiner* — Vishal Patel
(74) *Attorney, Agent, or Firm* — Michael Crilly, Esq.

(57) ABSTRACT

An improved air-riding seal system for turbine engines is presented. The seal system includes a movable primary seal assembly, a stationary secondary seal assembly, and at least one structure to increase the stiffness of a thin film between the primary seal and a rotating component. The primary seal assembly includes an annular seal ring and an arcuate support arm. The annular seal ring has a cross section that is substantially L-shaped and a surface with a step face and a circumferential dam. The arcuate support arm has a tooth at one end adjacent to an outermost circumferential surface along the seal runner, which could include an optional notch. The tooth and outermost circumferential surface are separated by a gap. The secondary seal ring is disposed between and contacts the primary seal assembly and housing structure so as to form a bore seal and a face seal therewith. A plurality of hydrodynamic pockets disposed along the circumferential dam and/or a plurality of radial dams disposed along the surface in an outward radial arrangement from the circumferential dam are provided to improve the stiffness of the thin film. Features of the invention allow for higher operating speeds.

8 Claims, 8 Drawing Sheets

AIR RIDING SEAL

CROSS REFERENCE TO RELATED APPLICATIONS

This application is a continuation application to U.S. Non-Provisional application Ser. No. 12/394,283 filed Feb. 27, 2009 now U.S. Pat. No. 7,938,402 which is a continuation-in-part application to U.S. Non-Provisional application Ser. No. 11/134,249 filed May 20, 2005 now abandoned which claims priority to U.S. Provisional Application No. 60/575,351 filed May 28, 2004, said applications being incorporated in their entirety herein by reference thereto.

FEDERALLY SPONSORED RESEARCH AND DEVELOPMENT

None.

BACKGROUND OF THE INVENTION

1. Field of the Invention

The invention generally relates to a hydrostatic seal for turbine engines. Specifically, the invention is a seal system including primary and secondary seals for use between a shaft and a housing to restrict the flow of a fluid from a higher pressure region to a lower pressure region. A combination of hydrostatic and/or hydrodynamic design elements improves the stiffness of an air film provided by the otherwise hydrostatic seal.

2. Background

A typical gas turbine engine includes numerous seals so as to prevent the recirculation of flow in the compressor and turbine stages, to meter cooling air, and to ensure that the main flow does not enter into the rotor bearing cavities. Such seals typically include stationary ring-shaped structures which operate within close proximity to rotating parts. Several exemplary seals include labyrinth, brush, and air-riding or film-riding systems.

A labyrinth seal is a mechanical device used to prevent the leakage of air or other fluids. A labyrinth seal typically includes a plurality of grooves interlocking with annular runners which restrict leakage by reducing the flow area. The gap or clearance between grooves and runners must allow for bearing clearance, shaft vibrations, deflections, thermal growth, and other similar factors in order to avoid contact between and damage to the grooves and runners. As such, the size of the gap within a labyrinth seal is proportional to the diameter of the seal, typically resulting in more flow leakage and lower efficiency as the size of the seal increases. Also, labyrinth seals by design include significant redundancies, which greatly increase the weight of larger diameter turbines.

A brush seal is another mechanical device used to prevent the leakage of air or other fluids. A brush seal could include a densely packed bed of directionally compliant bristles between a pair of plates. Bristles are oriented so as to contact or nearly contact a rotating part. Brush seals are credited with decreasing leakage within turbine-type applications; however, pressure and temperature considerations limit their applicability in compressor and turbine stages. Also, brush seals experience substantial wear and generate significant heat during the transient operations of a turbine.

An air-riding or film-riding seal is a non-contact device which exploits the pressure difference across the seal to induce a thin film of air in the gap between the face of the seal and a rotating part. The gap is independent of the diameter of the seal, thus avoiding the leakage, wear, and inefficiencies associated with larger labyrinth and brush seals.

Air-riding seals include hydrodynamic and hydrostatic systems. A hydrodynamic seal typically includes spiral grooves and relies on the relative surface velocity between a rotating part and the seal to establish the lift force to form and maintain an air film between the static seal and moving part. A hydrostatic seal relies on the pressure differential between upstream and downstream regions to form and maintain an air film therebetween. Accordingly, hydrodynamic seals are more efficient at higher surface velocities, whereas hydrostatic seals are better suited when pressure differentials of significant magnitude are exploitable.

Gas turbine engines for use with military and commercial aircraft must operate at higher temperatures to achieve the performance and efficiency requirements not required in other applications. The cooling of components within such engines is of the utmost importance.

Typically, critical high temperature components within a turbine engine are cooled by diverting air from the engine; however, this approach lowers component efficiencies and adversely affects inlet temperatures. It, therefore, becomes critical to minimize the amount of air diverted to cool the turbine. Compounding this problem is coolant leakage, which results in both higher amounts of flow being bled off than is required for cooling and a drop in the supply to the engine. Therefore, the ability to provide and maintain sealing throughout a turbine engine is essential in order to function properly.

Current gas turbine engines primarily use labyrinth knife-edge seals to meet this requirement. While these seals have been in use for many years, they have reached their limit in terms of leakage reduction. In addition, it is now generally recognized that their performance deteriorates over time, resulting in ever increasing flow leakage over the life of the seal.

Brush seals have been incorporated into at least one family of gas turbine engines to reduce leakage. In general, brush seals are an improvement over labyrinth seals; however, brush seals degrade with time as bristles are worn because of contact with a rotating part.

Some of the problems described above have been addressed by embodiments of the hydrostatic seal disclosed by Pope in U.S. Pat. No. 6,145,840 entitled Radial Flow Seals for Rotating Shafts which Deliberately Induce Turbulent Flow along the Seal Gap, which is incorporated herein in its entirety by reference thereto.

Pope discloses a face seal for a rotating shaft for use between normally high and normally lower pressure regions. A seal ring is shaped to form a gap between the ring and a runner surface along a shaft. The seal ring includes a ring-shaped sealing surface with a like-shaped seal dam extending therefrom. The gap converges in the direction of fluid flow and creates turbulent flow along the seal. A servo system coupled to the seal ring moves the ring away from the runner at lower pressure differentials and towards the runner at higher pressure differentials so as to restore the sealing function along the seal gap.

Future high-speed turbine engines, including those exceeding Mach 4, will require seals capable of withstanding temperatures in excess of 1500° Fahrenheit and rotational speeds in excess of 1500 feet-per-second, while minimizing leakage at critical locations in order to properly manage secondary flow. The ability to control secondary flow systems directly impacts component efficiencies and performance, component temperatures and thermal gradients, and component clearances over the operational range of a gas turbine engine. The control of such systems will become even more critical as the cooling temperatures within cooled cooling air (CCA) systems are reduced to further improve the performance of advanced engines. Unfortunately, the hydrostatic seal described in U.S. Pat. No. 6,145,840 does not adequately address the sealing challenges associated with advanced engines.

As is readily apparent from the discussions above, the related arts do not include an air-riding seal capable of providing the film stiffness necessary to prevent contact between a seal and seal runner at the speeds and temperatures of advanced engines.

Accordingly, what is required is a non-contact hydrostatic seal that provides a thin film which is sufficiently stiff to prevent contact between the seal and a rotating component under the operational conditions of advanced turbine engines.

SUMMARY OF THE INVENTION

An object of the invention is to provide a non-contact hydrostatic seal that provides a thin film which is sufficiently stiff to prevent contact between the seal and a rotating component under the operational conditions of advanced turbine engines.

In accordance with embodiments of the invention, the improved air-riding seal system includes a primary seal assembly, a secondary seal assembly, and a structure that increases the stiffness of a thin film between the seal system and a moving part. The primary seal assembly is movable between a seal runner extending from a rotatable shaft and a housing structure. The primary seal assembly includes an annular seal ring and an arcuate support arm. The annular seal ring has a cross section that is substantially L-shaped and a surface with a step face and a circumferential dam. The surface is disposed opposite of a sealing surface along the seal runner. The arcuate support arm has a tooth at one end adjacent to an outermost circumferential surface along the seal runner. The tooth and outermost circumferential surface are separated by a gap. The secondary seal ring is disposed between and contacts the primary seal assembly and housing structure so as to form a bore seal and a face seal therewith. The structure could include a plurality of hydrodynamic pockets disposed along the circumferential seal and/or a plurality of radial dams disposed along the surface in an outwardly radial arrangement from the circumferential dam.

In accordance with other embodiments of the invention, the outermost circumferential surface along the seal runner could include a notch that varies the gap depending on the relative position between the primary seal assembly and seal runner.

In accordance with yet other embodiments of the invention, the arcuate support arm and/or tooth could be sufficiently thick and stiff to minimize vibrations along the primary seal assembly.

In accordance with still other embodiments of the invention, the primary seal ring could be composed of a ceramic, preferably silicon nitride.

In accordance with yet still other embodiments of the invention, the primary seal ring could be composed of a plurality of arcuate seal segments which are separately adjustable.

Several advantages are offered by the invention. The invention provides positive sealing which is durable, predictable, and uniform over the lifespan of the seal. The invention minimizes leakage and improves the secondary air flow characteristics of gas turbine engines. The invention facilitates better fuel efficiency within gas turbine engines. The invention is applicable to inward flow and outward flow systems. The invention minimizes flexure effects along the seal at high rotational speeds. The invention improves the ability to track the runout of a rotor and to restore the thin film seal to equilibrium. The invention is applicable to engines operating at temperatures up to approximately 1500° Fahrenheit and rotational speeds up to approximately 1500 feet-per-second.

REFERENCE NUMERALS

1 Seal System
2 Primary seal assembly
3 Circumferential dam
4 Slep face
5 Housing structure
6 Secondary seal ring
7 Garter spring
8 Coil spring
9 Flange
10 Coil spring
11 Anti-rotation insert
12 Anti-rotation tab
13 Pivot ring
14 Back plate
15 Retaining ring
16 Retaining ring
17 Washer
18 Shafi
19 Seal runner
20 Lower pressure chamber
21 High pressure chamber
22 Sealing surface
23 Annular seal ring
24 Seal gap
25 Arcuale support arm
26 Outermost surface
27 Tooth
28 Gap
29 Extension
30 Scaling surface
31 Alignment arm
32 Spring stud
33 Extension
34 Extension
35 Radial dam
36 Nydrodynamie pocket
37 Notch
38 Segmented seal system
39 Carrier
40 Coil spring
41 Arcuate seal segment
42 Hydrostatic pocket
43 Arcuate dam
44 Radial dam
45 Arcuate support arm
46 Cavity
47 Inlet
48 Plenum
49 Step face

BRIEF DESCRIPTION OF THE DRAWINGS

The invention will now be described in more detail, by way of example only, with reference to the accompanying drawings, in which.

DETAILED DESCRIPTION OF THE INVENTION

Reference will now be made in detail to several preferred embodiments of the invention that are illustrated in the accompanying drawings. Wherever possible, same or similar reference numerals are used in the drawings and the description to refer to the same or like parts or steps. The drawings are in simplified form and are not to precise scale. The terms inner, outer, lower, upper, vertical, and horizontal are for descriptive purposes and are not intended to limit the intended scope of the invention and its various embodiments.

Figure 1:
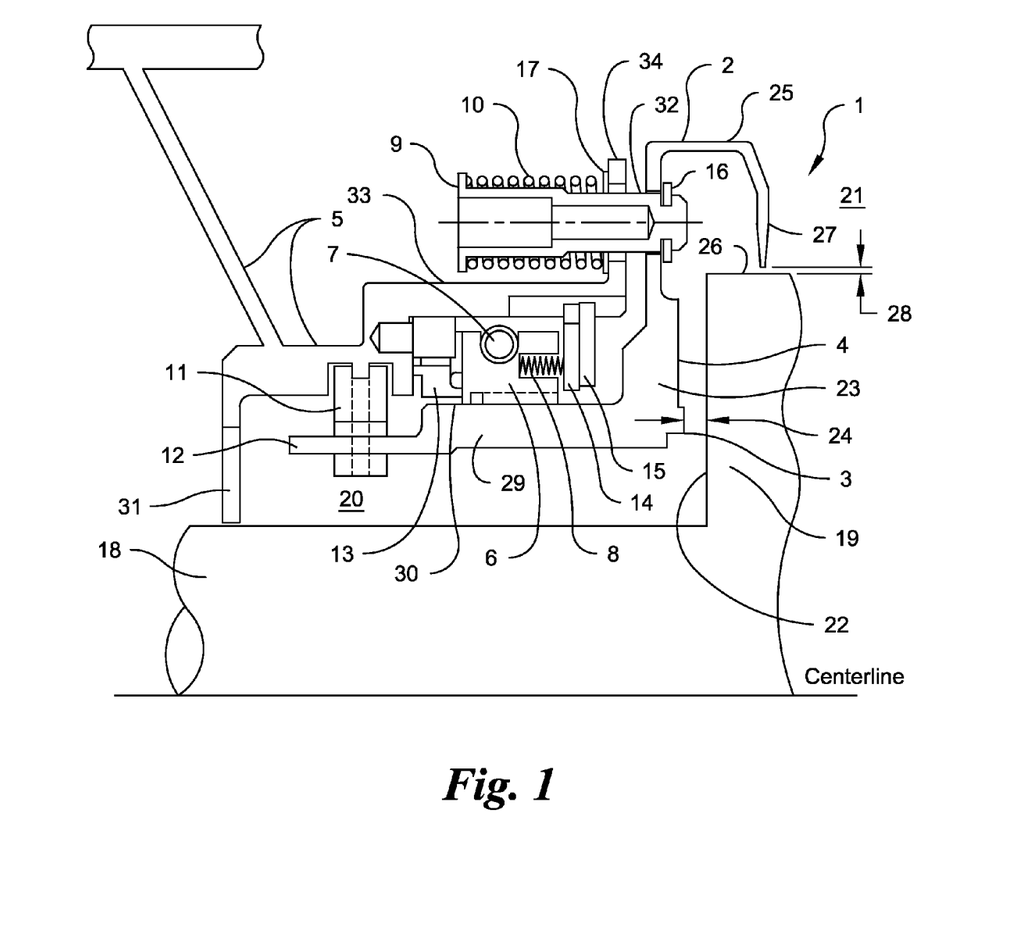
FIG. 1 is a cross sectional view illustrating a housing structure having a rotating shaft with annular runner and an adjustable hydrostatic seal system including a primary seal assembly with seal dam which provides a thin film seal with the seal runner and a secondary seal ring disposed between the housing structure and the primary seal assembly in accordance with an embodiment of the invention.

While the invention is described with particular reference to the design features in FIG. 1, the patentable aspects of the invention are likewise applicable to other configurations including, but not limited, to those described by Pope in U.S. Pat. No. 6,145,840 and by the inventors hereto in U.S. Provisional Application No. 60/575,351.

Referring now to FIG. 1, an exemplary embodiment of the seal system 1 is shown disposed about and adjacent to a shaft 18 within a housing structure 5 (not shown in its entirety) of a gas turbine engine, downstream from a compressor unit exit, having a high pressure chamber 21 and a lower pressure chamber 20 therein. The shaft 18 is adapted to rotate about its elongated axis at relatively high speed within the engine. The shaft 18 includes either integrally therewith, as shown herein or as attached thereto by means well known in the art, a radially extending annular seal runner 19 which extends laterally from the elongated axis of the shaft 18. The seal runner 19 has a radially extending, precisely machined, sealing surface 22 of annular configuration formed thereon. The lower pressure chamber 20 is shown adjacent to the rotating shaft 18, while the high pressure chamber 21 is located more outwardly of the outer edge of the seal runner 19.

Interposed between the high pressure chamber 21 and lower pressure chamber 20 is a primary seal assembly 2 positioned to move axially along the shaft 18 toward and away from the sealing surface 22. Fluid flow from the high pressure chamber 21 to the lower pressure chamber 20 is prevented by the primary seal assembly 2 from cooperating with other components within the housing structure 5, except along the vertical gap between the step face 4 and circumferential dam 3 along the primary seal assembly 2 and the seal surface 22 along the seal runner 19. The primary seal assembly 2 includes an annular seal ring 23 of generally L-shaped cross section which moves toward and away from the sealing surface 22 along the seal runner 19 to vary the size of the seal gap 24.

The housing structure 5 has an extension 33 of generally L-shaped cross section to which the primary seal assembly 2 is mounted and which serves to accommodate a secondary seal ring 6. The annular seal ring 23 moves axially toward and away from the seal runner 19 between the housing structure 5 and seal runner 19. The annular seal ring 23 is preferred to be a circumferentially continuous structure and to have a radially extending ring-shaped step face 4 thereon which is precisely machined and lapped opposite of the sealing surface 22 along the seal runner 19 creating the seal gap 24 therebetween. The step face 4 is of a flat configuration in the radial direction, and the convergence of the seal gap 24 is achieved by a step extending toward the sealing surface 22 to form a circumferential dam 3 about the annular seal ring 23. The height of the circumferential dam 3 is critical to this invention, as it must create a geometry which produces turbulent flow in the seal gap 24, thereby producing sufficient clearance between the annular seal ring 23 and seal runner 19 so as to provide a practical face seal assembly.

The left-most end of the housing structure 5 terminates in a plurality of alignment arms 31 which extend radially inward so as to support and center the seal system 1 relative to the shaft 18 and seal runner 19.

Extending from the outer periphery of the annular seal ring 23 is an arcuate support arm 25 of continuous, annular configuration which extends to overlie a portion of the outermost surface 26 along the seal runner 19. A ring-shaped, continuous, auxiliary restrictive tooth 27 of predetermined size extends from the arcuate support arm 25 toward the axial outermost surface 26 along the seal runner 19 forming a gap 28 between the tooth 27 and the outermost surface 26 also being important to the operation of the seal.

Extending in the axial direction away from seal runner 19 and from the inner end of the base of the L-shaped annular seal ring 23 is an extension 29, having a sealing surface 30 formed on the outer radial surface thereof to cooperate with the secondary seal ring 6 so as to provide a bore seal along the sealing surface 30. The extension 29 terminates in a plurality of anti-rotation tabs 12 which extend axially outwardly from the left-hand edge thereof so as to support and center the seal system 1 relative to the shaft 18 and seal runner 19.

The annular seal ring 23 and arcuate support arm 25 are preferred to be fabricated from a monolithic, homogeneous block of metal or ceramic. Exemplary metals include, but are not limited to, Inconel 718, 410 Stainless Steel, Waspaloy, and MARM 247, with or without a hard coating of solid lubricant known within the art. Compositions of the ceramic silicon nitride are likewise applicable because of its high modulus of elasticity, strength and thermal conductivity, allowing for reduced cross sectional dimensions along the annular seal ring 23 and arcuate support arm 25. Waspaloy, MARM 247, and silicon nitride also allow the arcuate support arm 25 to be thickened without substantial weight penalties so as to improve the vibrational characteristics of the primary seal assembly 2.

A plurality of spring studs 32 pass through a like number of openings along a vertical extension 34 along the housing structure 5 in a slidable arrangement. One end of each spring stud 32 is fixedly attached to the annular seal ring 23 via a retaining ring 16. The other end of each spring stud 32 includes a flange 9 which contacts one end of a coil spring 10 disposed about the spring stud 32. The other end of each coil spring 10 contacts a washer 17 which thereafter contacts the extension 34 along the housing structure 5. Each coil spring 10 is constrained between the flange 9 and the extension 34. Spring stud 32 is extendible through the extension 34 via one or more servo or other drive mechanisms, not shown here. Likewise, it is possible for the spring studs 32 to extend and retract in response to pressure and/or pressure differentials adjacent to the seal system 1. Coil springs 10 urge the annular seal ring 23 away from seal runner 19 as the applied force is reduced.

In order to ensure that fluid flow from the high pressure chamber 21 to the lower pressure chamber 20 passes only along the seal gap 24, the secondary seal ring 6 contacts a pivot ring 13 along one surface and is interposed to provide a bore seal between the outward circumference of the extension 29, as well as a seal with the housing structure 5 immediately adjacent thereto. The secondary seal ring 6 along the sealing surface 30 is in alignment with the topmost step feature along the circumferential dam 3 so that sealing surface 30 forms the balance diameter of the primary seal assembly 2. The secondary seal ring 6 may be comprised of many known seal arrangements, such as a piston ring or a segmented annular seal ring 23. Alternatively, an annular bellows seal may be interposed directly between annular seal ring 23 and housing structure 5 to achieve the sealing function. For a more detailed understanding of the secondary seal ring 6 illustrated in FIG. 1, reference is made to U.S. Pat. No. 4,082,296, which is incorporated herein in its entirety by reference thereto, without the negative hydrodynamic lift feature since the seal herein is a non-rotating part.

The secondary seal ring 6 is designed to complement the application in which the primary seal 2 is being employed; thus, for a gas face seal, a different secondary seal may be employed from an application wherein the primary seal assembly 2 and secondary seal ring 6 are in a liquid medium.

The secondary seal ring 6 does not form a part of this invention other than to ensure that a secondary sealing function occurs. Thus, as an example, employing the seal ring of FIGS. 1 through 4 from U.S. Pat. No. 4,082,296 for the secondary seal ring 6, a garter spring 7 urges the seal segments into engagement with the sealing surface 30 along the annular seal ring 23 to provide a bore seal. At the same time, a plurality of symmetrically-spaced axial coil springs 8 are interposed between the secondary seal ring 6 and a back plate 14 contacting a retaining ring 15 attached to the housing 5, so as to move the secondary seal ring 6 towards the pivot ring 13 to form a face seal. Each coil spring 8 is received in a like-sized recess about the secondary seal ring 6.

The left-most end of the extension 29 further includes a plurality of anti-rotation tabs 12 which extend away from the seal runner 19. Each anti-rotation tab 12 contacts and is secured to an anti-rotation insert 11, the latter attached to the housing structure 5. The anti-rotation tabs 12 are movable axially only so as to permit the function of the primary seal 2 with respect to the seal runner 19 and to prevent rotation motion about the rotational axis of the shaft 18 and seal runner 19.

Figure 2A:
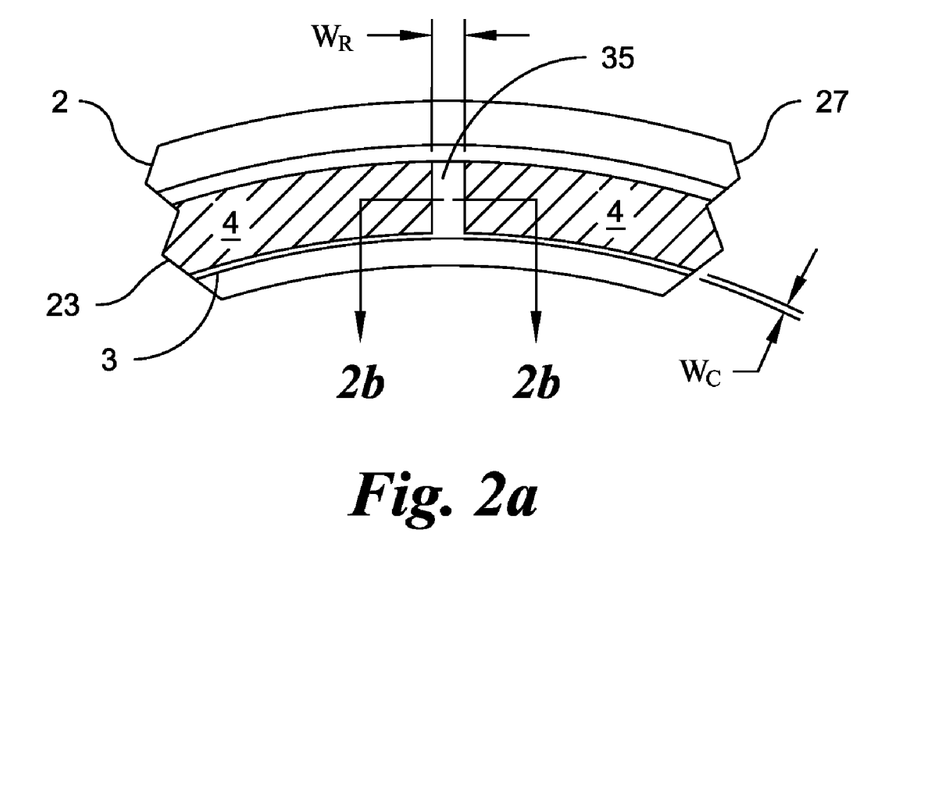
FIG. 2a is an enlarged front side view illustrating a portion of a primary seal assembly having a circumferential dam disposed around the seal and a radial dam disposed in an outward radial orientation along a portion of the seal step in accordance with an embodiment of the invention.
Figure 2B:
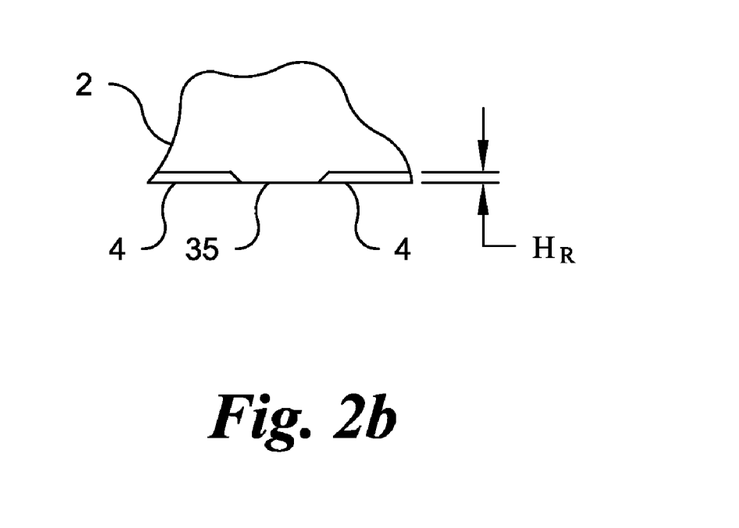
FIG. 2b is a cross sectional view from FIG. 2a illustrating the profile of the radial dam along a portion of the seal in accordance with an embodiment of the invention.

Referring now to FIGS. 2a and 2b, the step face 4 along a portion of the annular seal ring 23 from an embodiment of the primary seal assembly 2 is shown with a circumferential dam 3 and a radial dam 35 to improve the stiffness of the thin film seal. The circumferential dam 3 traverses the circumference of and extends from the annular seal ring 23 so as to form a stepped structure of generally circular shape. The radial position of the circumferential dam 3 is design dependent; however, in preferred embodiments the circumferential dam 3 is positioned way from the tooth 27 towards the inner radius of the annular seal ring 23, as represented in FIG. 2a. The radial dam 35 is disposed along and extends from the face of the annular seal ring 23 along the step face 4 so as to intersect or bisect the circumferential dam 3 in an outwardly radial fashion. In preferred embodiments, a plurality of radial dams 35, one non-limiting example being twelve such dams, is provided about the face of the annular seal ring 23. In other embodiments, the radial dams 35 could be provided without a circumferential dam 3. The radial dams 35 reduce the relative rotational velocity between a fluid and the annular seal ring 23 so as to further facilitate the development of a stiffened thin film between the stationary seal and dynamic rotor as pressure breaks down over the seal face.

The width ($W_R$) and height ($H_R$) of the radial dam 35 are design dependent. In preferred embodiments, the width ($W_R$) is approximately as wide as the width ($W_C$) of the circumferential dam 3 and the height ($H_R$) is at least as high as that of the circumferential dam 3 so that the surface of both elements lie within a common plane. The radial dam 35 could be machined into the surface of the annular seal ring 23 and surface lapped to minimize height variations along the seal. For example, a radial dam 35 with a nominal height of 0.003-inches and a nominal width of 0.063-inches significantly increased the stiffness of a thin film with a thickness between 0.001-inches and 0.003-inches, than otherwise formed by a circumferential dam 3 alone with a nominal height of 0.003-inches and a nominal width of 0.083-inches.

Figure 3A:
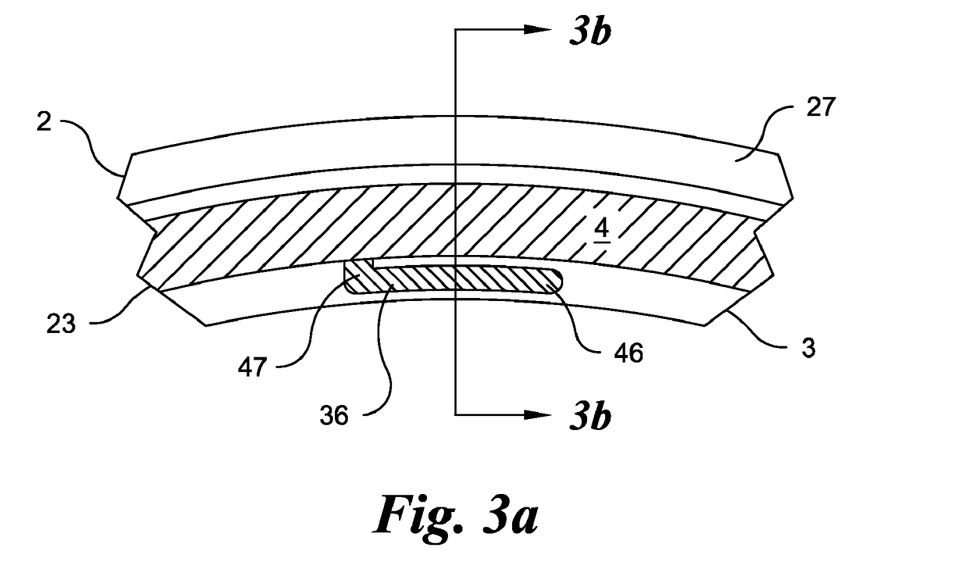
FIG. 3a is an enlarged front side view illustrating a portion of a primary seal having a hydrodynamic pocket disposed along the circumferential dam in accordance with an embodiment of the invention.
Figure 3B:
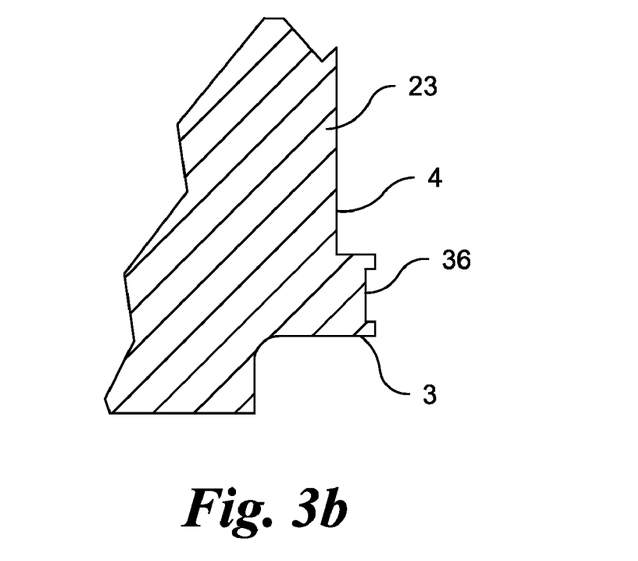
FIG. 3b is a cross sectional view from FIG. 3a illustrating the profile of the hydrodynamic pocket along the circumferential dam in accordance with an embodiment of the invention.

Referring now to FIGS. 3a and 3b, an exemplary hydrodynamic pocket 36 is shown along the circumferential dam 3 so as to improve the stiffness of a thin film seal for an embodiment of the primary seal assembly 2. The hydrodynamic pocket 36 could include a cavity 46, or depression, lengthwise disposed along a portion of the circumference of the circumferential dam 3 and an inlet 47, also being a cavity or depression, disposed between the cavity 46 and step face 4. The depth of the cavity 46 and inlet 47 could exceed the height of the circumferential dam 3; however, the depth is preferred to be equal to or less than the height of the circumferential dam 3, as represented in FIG. 3b.

The inlet 47 directs fluid along the step face 4 into the cavity 46. Thereafter, the hydrodynamic pocket 36 communicates the fluid into seal gap 24. In preferred embodiments, a plurality of hydrodynamic pockets 36 is provided about the circumferential dam 3 in a symmetric arrangement to balance the stiffness of and forces along the thin film seal between the stationary annular seal ring 23 and rotating seal runner 19.

Figure 4:
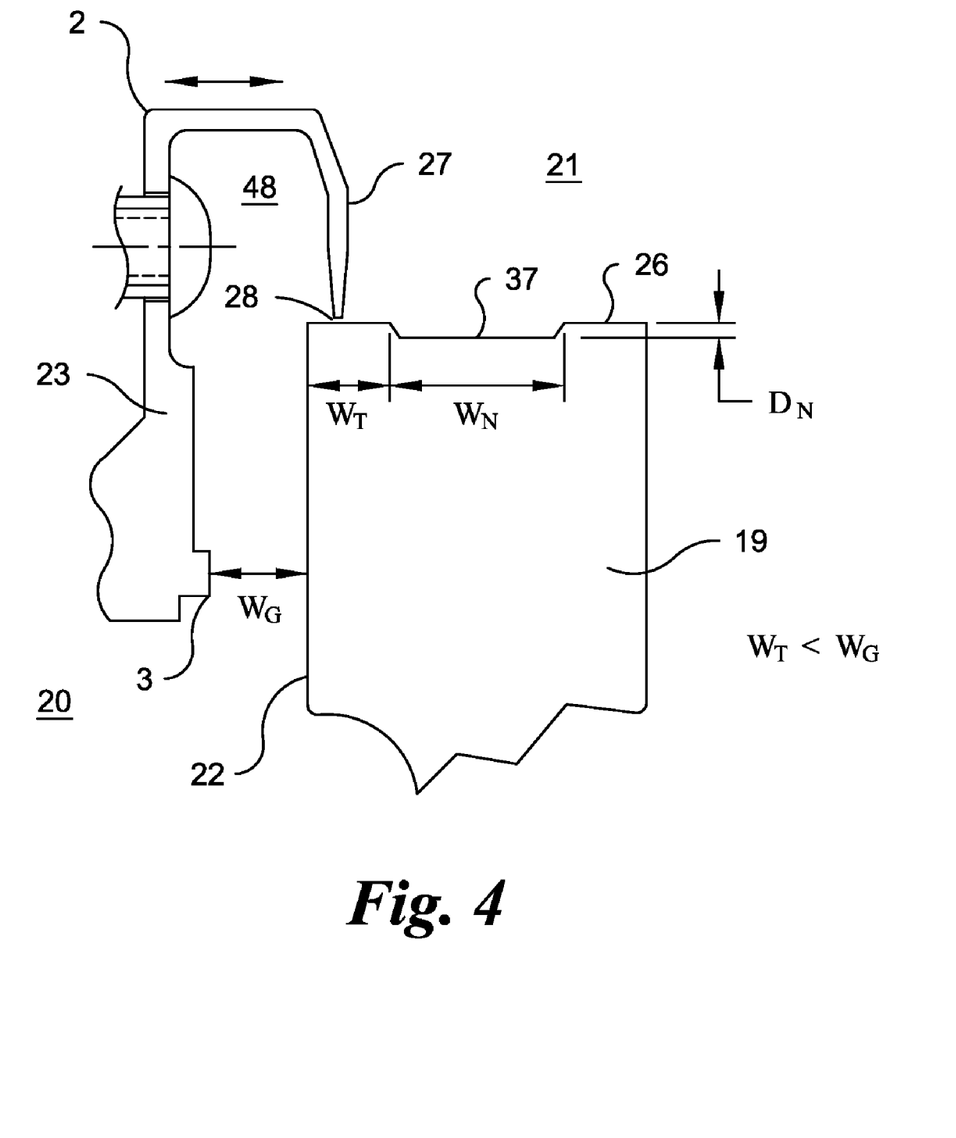
FIG. 4 is an enlarged cross sectional view illustrating a notch disposed along and about the outermost circumferential surface of a seal runner and immediately adjacent to the tooth along the primary seal assembly.

Referring now to FIG. 4, the seal runner 19 is shown including a notch 37 disposed along the outermost surface 26 of the seal runner 19 to improve the sealing performance of a primary seal assembly 2. The notch 37 is a depression or cavity that is machined into or formed onto the seal runner 19 during manufacture. The depth ($D_N$) of the notch 37 could be uniform along its width ($W_N$), as represented in FIG. 4, or variable, one example being a tapered profile. In general, the depth ($D_N$) and clearance at the gap 28 between the tooth 27 and seal runner 19 should allow the pressure within the plenum 48 formed by the arcuate support arm 25 to increase as the primary seal assembly 2 approaches the seal runner 19. For example, the gap 28 between the tooth 27 and outermost surface 26 at startup or shutdown is preferred to restrict air flow from the high pressure chamber 21 into the plenum 48 and lower pressure chamber 20. At least as early as the establishment of steady-state conditions, the distance between the tooth 27 and outermost surface 26 along the notch 37 should increase to allow more fluid flow into the plenum 48 and lower pressure chamber 20. Accordingly, the distance from the edge of the seal runner 19 to the notch 37 ($W_T$) should be less than the distance between the seal dam 3 along the annular seal ring 23 and sealing surface 22 ($W_G$).

Figure 5A:
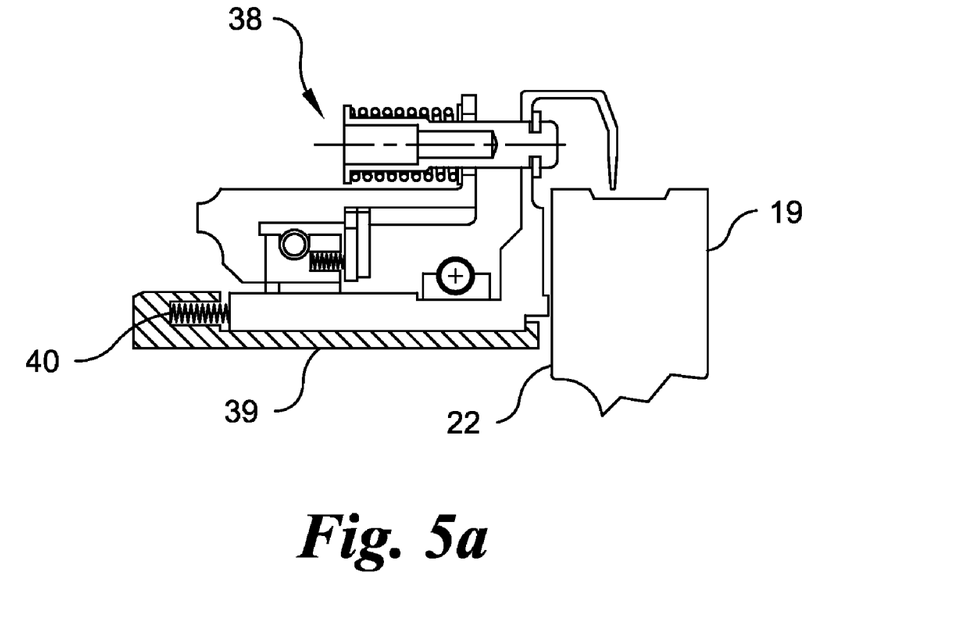
FIG. 5a is a partial cross sectional view illustrating a segmented seal system wherein the primary seal assembly includes two or more arcuate seal segments disposed about the circumference of the seal system in accordance with an embodiment of the invention.
Figure 5B:
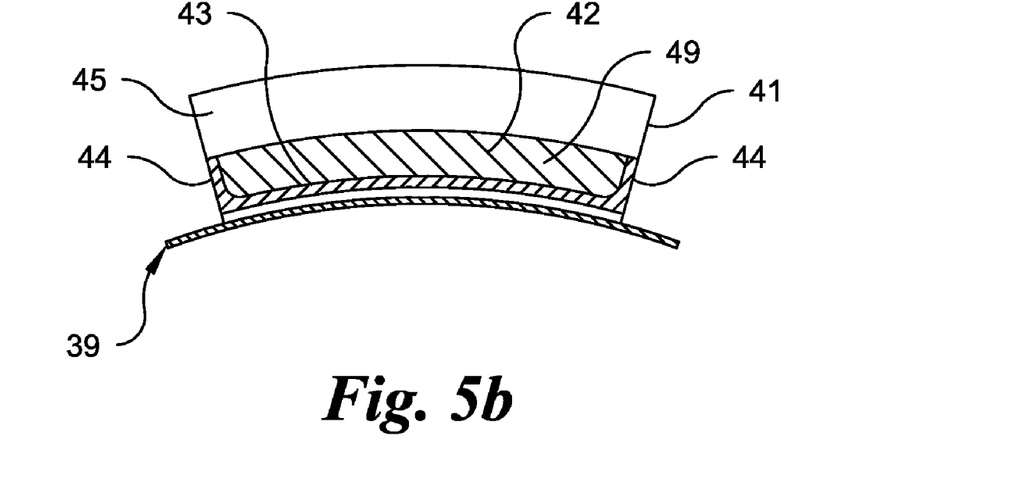
FIG. 5b is an enlarged front side view from FIG. 5a illustrating one such arcuate seal segment from the segmented seal system having a hydrostatic pocket bounded by circumferential and radial dams in accordance with an embodiment of the invention.

Referring now to FIGS. 5a and 5b, a segmented seal system 38 is shown comprising a modified version of the primary seal assembly 2, as well as the secondary seal ring 6, housing structure 5, and other elements, as described herein. In the embodiments contemplated here, the primary seal assembly 2 includes at least two complete and independent arcuate seal segments 41 which in combination form a ring-shaped structure. Each arcuate seal segment 41 has a cross section that is substantially L-shaped and a surface with a step face 49 and an arcuate dam 43 both disposed on the arcuate seal segment 41 so as to allow placement adjacent to a sealing surface 22 along a seal runner 19. An arcuate support arm 45, with tooth, extends from one end of each arcuate seal segment 41. Optional radial dams 44 are provided along the face and at the ends of each arcuate seal segment 41 so as to form a hydrostatic pocket 42 along the seal face. Each arcuate seal segment 41 is attached to at least one spring stud 32 so as to facilitate the separate and independent adjustment of each arcuate seal segment 41 with respect to a seal runner 19. A cylindrical-shaped carrier 39 composed of a metal or ceramic could be disposed immediately adjacent to and between the segmented seal system 38 and rotating shaft 18. The carrier 39 could be attached to or contact the housing structure 5. The arcuate seal segments 41 contact the carrier 39 and are supported thereby so as to allow movement by the arcuate seal segments 41 along the length of the shaft 18. At least one coil spring 40 is disposed between and contacts each arcuate seal segment 41 and the carrier 39 so as to bias the arcuate seal segments 41 toward the seal runner 19.

In addition to other advantages, the segmented seal system 38 provides better runout tracking between the rotor and seal face. The segments allow for separate and independent adjusts to achieve an optimum clearance based upon the characteristics of the rotor face immediately adjacent to each segment. This adjustability allows further adjustments along the segmented seal system 38 in response to coning of the rotor face. Individual segments also have less mass as compared to the full ring (although the total mass of the individual segments could be the same as a contiguous ring), thereby reducing inertia effects which adversely affect runout tracking.

It will be appreciated from the descriptions provided for FIGS. 2a, 2b, 3a, 3b, 4, 5a, and 5b, that two or more such design features could be combined for use within a seal system 1 or segmented seal system 38.

Figure 6:
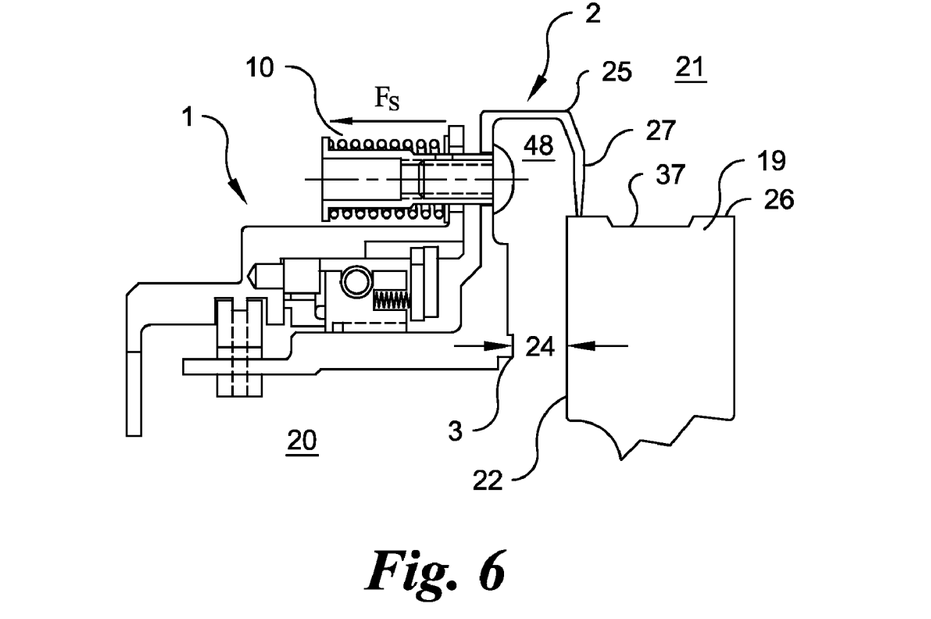
FIG. 6 is a cross sectional view illustrating the relative arrangement between a seal system and seal runner at start-up and shut down with no differential pressure between high and lower pressure chambers in accordance with an embodiment of the invention.
Figure 7:
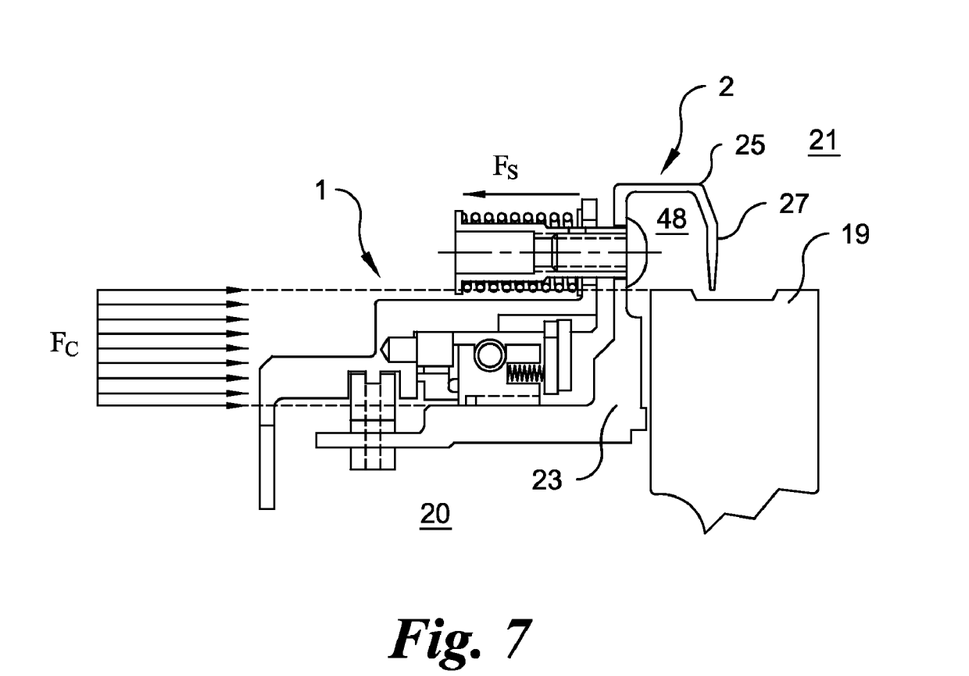
FIG. 7 is a cross sectional view illustrating the relative arrangement between a seal system and seal runner and forces thereon after start-up but prior to the establishment of steady-state conditions within a turbine engine in accordance with an embodiment of the invention.
Figure 8:
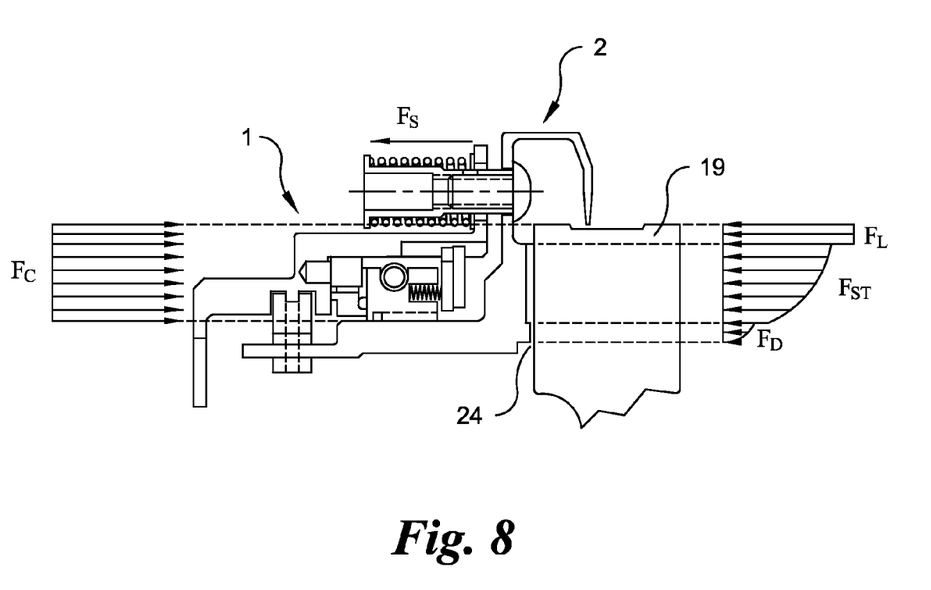
FIG. 8 is a cross sectional view illustrating the relative arrangement between a seal system and seal runner and force balance thereon after establishment of steady-state conditions within a turbine engine in accordance with an embodiment of the invention.

Referring now to FIGS. 6-8, functional aspects of the seal system 1 is described with particular reference to movement of the primary seal assembly 2 toward and away from a seal runner 19. The description is likewise applicable to the segmented seal system 38 recognizing the functional differences due to the segmented construction of the primary seal and appropriate substitution of elements, as provided above. Furthermore, while specific reference is made to the events associated with startup, it is understood that the reverse is applicable during shutdown.

Referring again to FIG. 6, the primary seal assembly 2 within a seal system 1 is shown in its retracted position at startup and shutdown. A large seal gap 24 lies between the circumferential dam 3 and sealing surface 22 along the seal runner 19. The tooth 27 is positioned along the outermost surface 26 away from the notch 37 so as to restrict fluid flow between the high pressure chamber 21 and lower pressure chamber 20. The force balance is limited to the spring force (FS) imposed by the coil springs 10 within the primary seal assembly 2.

Referring again to FIG. 7, the primary seal assembly 2 is shown in its partially extended condition after startup but prior to the establishment of steady-state conditions. This phase includes an increase in the pressure within the high pressure chamber 21 and the formation of a thrust balance which moves the primary seal assembly 2, namely, the annular seal ring 23 and arcuate support arm 25 with tooth 27, towards the seal runner 19. Thereafter, a pressure drop develops between the balance diameter and the tooth 27 resulting is a closing force ($F_C$) of generally uniform distribution. The magnitude of the closing force is sufficient to overcome at least the spring force ($F_S$) and friction forces associated with the seal system 1. The aspirator tooth 27 is the primary breakdown mechanism causing the plenum 48 to pressurize resulting in an unbalanced condition which forces the annular seal ring 23 towards the seal runner 19. Thereafter, a hydrostatic thin film is established between the annular seal ring 23 within the seal system 1 and the seal runner 19.

Referring again to FIG. 8, the seal system 1 reaches equilibrium when a force balance is achieved between the closing force ($F_C$) and other forces within the system so that a seal gap 24 of relatively constant thickness is established. During this phase, the closing force ($F_C$) is sufficient to overcome the spring force ($F_S$), as well as the friction forces ($F_F$), and inertia forces ($F_I$) inherent to the system. At equilibrium, the opposing forces further include the force across the labyrinth tooth 27 ($F_L$), the air bearing force across the step face 4 ($F_{ST}$), and the force due to the pressure breakdown drop across the circumferential dam 3 ($F_D$). The latter forces are responsible for tracking the runout of a rotor, restoring the thin film seal to equilibrium, and preventing contact between the annular seal ring 23 and seal runner 19.

The design features described herein are responsible for increasing at least one or more of the forces noted above, thereby stiffening the thin film.

The radial dams 35 in FIGS. 2a-2b increase at least the force along the step face 4 ($F_{ST}$). The radial dams 35 not only increase the film stiffness, but also allow for higher shaft speeds by reducing seal vibrations at speeds above 700 feet-per-second, thereby avoiding excitations which could cause contact between the primary seal assembly 2 and seal runner 19.

The hydrodynamic pockets 35 in FIGS. 3a-3b increase at least the force along the circumferential dam 3 ($F_D$). Hydrostatic seals alone produce a film clearance of approximately 0.0015-inches. Hydrodynamic seals alone produce a film clearance between approximately 0.0002-inches and 0.0005-inches depending on the closing force. Accordingly, the combination of hydrodynamic and hydrostatic seal features as described herein increases the opening force along the seal gap 24 when the clearance is less than 0.0005-inches.

The notch 37 in FIG. 4 increases at least the force along the tooth 27 ($F_L$). The arcuate seal segments 41 in FIG. 5 increase at least the force along the step face 4 ($F_{ST}$) and circumferential dam 3 ($F_D$).

Figure 9:
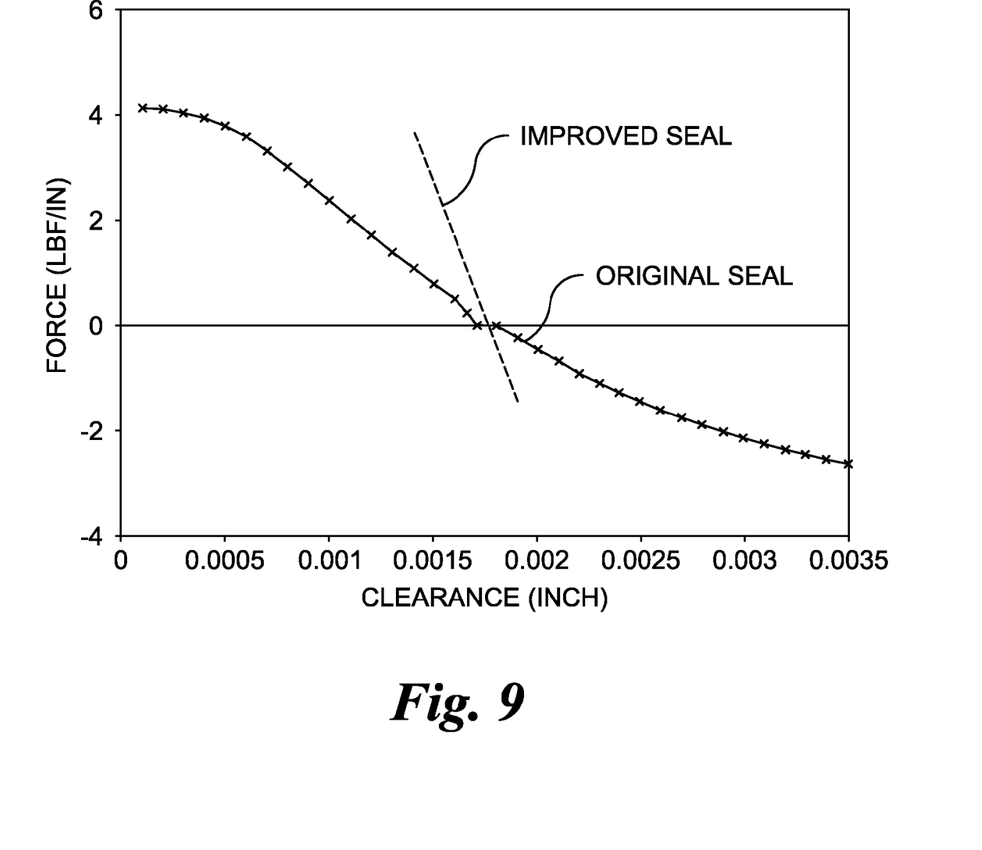
FIG. 9 is an exemplary force versus clearance (or gap) plot illustrating increased stiffness within the thin film provided by an embodiment of the invention herein in comparison to an embodiment of the air riding seal described by Pope in U.S. Pat. No. 6,145,840.

Referring now to FIG. 9, a plot compares the force versus clearance (or gap) along the interface between an annular seal ring 23 and a seal runner 19. The force represents the restoring force generated at various clearances representative of the width of the seal gap 24. The slope of each curve is indicative of the stiffness of the thin film seal between the primary seal assembly 2 and sealing surface 22, such that a stiffer film has a greater slope. An improved seal exemplary of the devices described herein is shown to have a steeper slope and therefore capable of producing a thin film seal with greater stiffness than presently known or original seals.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. An air-riding seal system comprising:
   (a) a cylindrical-shaped carrier disposed about a rotatable shaft with a seal runner extending therefrom;
   (b) a primary seal assembly including at least two arcuate seal segments which form a ring-shaped seal, each said arcuate seal segment contacts said cylindrical-shaped carrier and is movable thereon, each said arcuate seal segment having a cross section that is substantially L-shaped and a surface with a step face and an arcuate dam, said surface disposed opposite of a sealing surface along said seal runner, each said arcuate seal segment having an arcuate support arm disposed at one end thereof and having a tooth disposed at another end adjacent to an outermost circumferential surface along said seal runner, each said tooth and said outermost circumferential surface separated by a gap;
   (c) a secondary seal ring disposed between and contacting said primary seal assembly and a housing structure so as to form a bore seal and a face seal therewith;
   (d) a structure along each said surface of said primary seal assembly which increases stiffness of a thin film between each said surface and said sealing surface, said structure being at least one hydrodynamic pocket disposed along said arcuate dam or at least two radial dams disposed along said surface in an outward radial arrangement with respect to said arcuate dam;
   (e) a first coil spring disposed between each said arcuate seal segment and a portion of said housing structure, said first coil spring urges said arcuate seal segment away from said seal runner in response to pressure condition adjacent to said air-riding seal system; and
   (f) a second coil spring disposed between each said arcuate seal segment and said cylindrical-shaped carrier, said second coil spring biases said arcuate seal segment toward said seal runner.

2. The air-riding seal system of claim 1, wherein said outermost circumferential surface along said seal runner has a notch that varies each said gap depending on relative position between each said arcuate seal segment and said seal runner.

3. The air-riding seal system of claim 1, wherein said arcuate support arm or said tooth is sufficiently stiff to minimize vibrations along each said primary seal assembly.

4. The air-riding seal system of claim 1, wherein each said arcuate seal segment and said arcuate support arm are composed of a ceramic composition.

5. The air-riding seal system of claim 4, wherein said ceramic composition is silicon nitride.

6. A gas turbine engine having at least one air-riding seal system of claim 1.

7. The gas turbine engine of claim 6, wherein said air-riding seal system provides a thin film adjacent to a rotating component, said thin film being sufficiently stiff to prevent contact between said air-riding seal system and said rotating component when operational conditions within said gas turbine engine include temperatures up to approximately 1500° Fahrenheit and rotational speeds up to approximately 1500 feet-per-second.

8. The gas turbine engine of claim 6, wherein said air-riding seal system provides a thin film adjacent to a rotating component having a notch that varies air flow depending on relative position between said air-riding seal system and said rotating component.

* * * * *